(12) United States Patent
Makino et al.

(10) Patent No.: US 11,680,193 B2
(45) Date of Patent: Jun. 20, 2023

(54) LOW-TEMPERATURE HEAT-CURABLE ADHESIVE COMPOSITION FOR STRUCTURE

(71) Applicants: CEMEDINE CO., LTD., Tokyo (JP); MAZDA MOTOR CORPORATION, Hiroshima (JP)

(72) Inventors: Daisuke Makino, Tokyo (JP); Atsuhiko Suzuki, Tokyo (JP); Yusuke Murachi, Tokyo (JP); Motoyasu Asakawa, Hiroshima (JP); Katsuya Himuro, Hiroshima (JP); Kenichi Yamamoto, Hiroshima (JP)

(73) Assignees: CEMEDINE CO., LTD., Tokyo (JP); MAZDA MOTOR CORPORATION, Hiroshima (JP)

( * ) Notice: Subject to any disclaimer, the term of this patent is extended or adjusted under 35 U.S.C. 154(b) by 938 days.

(21) Appl. No.: 16/497,552

(22) PCT Filed: Mar. 23, 2018

(86) PCT No.: PCT/JP2018/011607
§ 371 (c)(1),
(2) Date: Sep. 25, 2019

(87) PCT Pub. No.: WO2018/180955
PCT Pub. Date: Oct. 4, 2018

(65) Prior Publication Data
US 2021/0102101 A1 Apr. 8, 2021

(30) Foreign Application Priority Data
Mar. 27, 2017 (JP) .............................. JP2017-060693

(51) Int. Cl.
*C09J 163/00* (2006.01)
*B62D 65/02* (2006.01)
(Continued)

(52) U.S. Cl.
CPC ............ *C09J 163/00* (2013.01); *B62D 65/02* (2013.01); *C08G 59/188* (2013.01); *C08K 3/22* (2013.01);
(Continued)

(58) Field of Classification Search
CPC ... C09J 163/00; C09J 5/06; C09J 11/04; C09J 11/06; C09J 2400/16; C09J 2463/00;
(Continued)

(56) References Cited

U.S. PATENT DOCUMENTS

2008/0251202 A1 10/2008 Eagle et al.
2012/0103517 A1 5/2012 Eagle et al.
(Continued)

FOREIGN PATENT DOCUMENTS

CN 1411478 4/2003
CN 105683238 6/2016
(Continued)

OTHER PUBLICATIONS

International Search Report dated May 1, 2018 in International Application No. PCT/JP2018/011607.
(Continued)

*Primary Examiner* — Daniel H Lee
(74) *Attorney, Agent, or Firm* — Wenderoth, Lind & Ponack, L.L.P.

(57) ABSTRACT

Provided are a low-temperature heat-curable adhesive composition for structures which is able to cure at a low temperature in a short time, is reduced in groove defects after open-state standing, and is excellent in rust-preventive property, corrosion resistance, shower resistance, and workability; and a method for producing an automotive structure using the adhesive composition. The low-temperature heat-curable adhesive composition for structures includes (A) an epoxy resin, (B) a micro-encapsulated curing agent, (C) a
(Continued)

hygroscopic agent, (D) a viscosity modifier, and (E) a stabilizer. The hygroscopic agent (C) is calcium oxide, which suitably includes both a surface-treated grade and a non-surface-treated grade.

2 Claims, 2 Drawing Sheets

(51) Int. Cl.
    *C08G 59/18*     (2006.01)
    *C08K 3/22*     (2006.01)
    *C08K 3/36*     (2006.01)
    *C09J 5/06*     (2006.01)
    *C09J 11/04*     (2006.01)
    *C09J 11/06*     (2006.01)

(52) U.S. Cl.
    CPC .................. *C08K 3/36* (2013.01); *C09J 5/06* (2013.01); *C09J 11/04* (2013.01); *C09J 11/06* (2013.01); *C08K 2003/2206* (2013.01); *C09J 2400/16* (2013.01); *C09J 2463/00* (2013.01)

(58) Field of Classification Search
    CPC ...... B62D 65/02; B62D 65/00; C08G 59/188; C08K 3/22; C08K 3/36; C08K 2003/2206
    See application file for complete search history.

(56) References Cited

U.S. PATENT DOCUMENTS

| | | | |
|---|---|---|---|
| 2013/0090431 A1 | 4/2013 | Ming et al. | |
| 2014/0037966 A1 | 2/2014 | Renkel et al. | |
| 2014/0039118 A1 | 2/2014 | Renkel et al. | |
| 2015/0025176 A1* | 1/2015 | Eagle | C08K 3/016 228/175 |
| 2015/0166857 A1 | 6/2015 | Ming et al. | |
| 2016/0244603 A1 | 8/2016 | Okamoto | |

FOREIGN PATENT DOCUMENTS

| | | |
|---|---|---|
| DE | 10 2011 007 893 | 10/2012 |
| JP | 58-83023 | 5/1983 |
| JP | 58-55970 | 12/1983 |
| JP | 64-70523 | 3/1989 |
| JP | 4-88077 | 3/1992 |
| JP | 5-247179 | 9/1993 |
| JP | 6-73163 | 3/1994 |
| JP | 2000-281759 | 10/2000 |
| JP | 2010-523800 | 7/2010 |
| JP | 2010-189542 | 9/2010 |
| JP | 2011-148869 | 8/2011 |
| JP | 2011148869 A * | 8/2011 |
| JP | 2013-535523 | 9/2013 |
| JP | 2015/518065 | 6/2015 |
| JP | 2016-172528 | 9/2016 |
| WO | 01/46290 | 6/2001 |
| WO | 2012/000171 | 1/2012 |
| WO | 2014/103552 | 7/2014 |

OTHER PUBLICATIONS

Office Action dated Oct. 15, 2021 in corresponding Chinese Patent Application No. 201880021061.2, with English Machine Translation.

Office Action dated Feb. 9, 2021, in corresponding Chinese Patent Application No. 201880021061.2, with English translation.

Office Action dated Jul. 14, 2020 in German Patent Application No. 11 2018 618.8, with English-language translation.

Office Action dated Dec. 17, 2020 in Japanese Patent Application No. 2017-060693, with English-language translation.

\* cited by examiner

1

LOW-TEMPERATURE HEAT-CURABLE ADHESIVE COMPOSITION FOR STRUCTURE

TECHNICAL FIELD

The present invention relates to a low-temperature heat-curable adhesive composition for structures used to manufacture an automotive structure by structurally bonding bodies and parts of an automobile.

BACKGROUND ART

In the related art, an adhesive composition for structures used for producing an automotive structure by joining body panels or body parts of an automobile is known.

The adhesive composition which needs to be heated to a high temperature to cure may cause the problem in that economical efficiency is reduced due to high temperature baking, a base material requires heat resistance, products deteriorate due to heat, and the like. In addition, when the adhesive composition is applied to parts of an automotive structure where the temperature is difficult to rise, there is a risk of poor curing due to insufficient heating. Therefore, a low-temperature curable adhesive for structures capable of low-temperature baking is required. As a method for realizing low-temperature curing, there may be a method for blending a low-temperature curing type curing accelerator into an adhesive. For example, Patent Document 1 discloses a bonding method by using a latent epoxy curing agent obtained by addition polymerization of alicyclic diamine and alkyl (meth)acrylate and thermally curing the latent epoxy curing agent at 60 to 120° C. for bonding.

In addition, in an application process of an adhesive, an application procedure is set such that the adhesive slightly protrudes from a gap between a joining end part and a joined part by a clamping pressure during a welding process in consideration of adhesiveness and sealing property. Since the applied heat-curable adhesive is cured by heat of a drying furnace, the adhesive has physical properties that a viscosity of the adhesive once decreases during a period during which temperature is raised from normal temperature (for example, 20° C.) to curing temperature (for example, 150° C.) while the drying furnace moves, during the so-called bonding middle period, so that the protruding portion of the adhesive flows outwardly to be separated from an overlapping part between the joining end part and the joined part and groove defects are likely to occur due to the movement of the protruding portion. If the groove defects occur, electro-deposition coating may be broken and rust may be generated. Therefore, there is a demand for an adhesive that does not cause the groove defects. As an adhesive condition for realizing this, Patent Document 2 discloses that a minimum value of a complex viscosity during warming is set to 200 Pa·s or less.

In general, the curing accelerator in the adhesive mainly composed of an epoxy resin retains its potential by existing in the epoxy resin as a solid. The curing accelerator melts by heat and accelerates a curing reaction by contacting with the epoxy resin. However, the low-temperature curing accelerator accelerates the reaction with the epoxy resin even by the presence of water, and therefore the viscosity increases when the adhesive absorbs moisture. As the viscosity increases, the minimum complex viscosity during heating also increases, and thus the adhesive flows outwardly to be separated from the overlapping part of the joining end and the joined part, and the groove defects occur due to the movement of the protruding portion, so that there is a problem in that the electro-deposition coating is broken and the rust-preventive property deteriorates. In the process of producing an automobile, the adhesive is applied and is then left before bonding (referred to as "open-state standing" in the present specification). In this case, the groove defects occur particularly after heat curing, and the corrosion resistance deteriorates.

In addition, the adhesive having a small initial viscosity may be blown away by a shower in a shower process in an automobile producing assembly line.

CITATION LIST

Patent Literature

Patent Document 1: JP 2001-281759 A
Patent Document 2: JP 2016-172528 A

SUMMARY OF INVENTION

Technical Problem

The present invention has been made in view of the above-mentioned problems of the related art, and an object of the present invention is to provide a low-temperature heat-curable adhesive composition for structures which is able to cure at a low temperature in a short time, is reduced in groove defects after open-state standing, and is excellent in rust-preventive property, corrosion resistance, shower resistance, and workability, and a method for producing an automotive structure using the adhesive composition.

Solution to Problem

In order to solve the above problems, according to the present invention, the low-temperature heat-curable adhesive composition for structures includes: (A) an epoxy resin, (B) a micro-encapsulated curing agent, (C) a hygroscopic agent, (D) a viscosity modifier, and (E) a stabilizer.

The (C) hygroscopic agent is calcium oxide and preferably contains both surface-treated grade and non-surface-treated grade.

In the low-temperature heat-curable adhesive composition for structures, a minimum value of a complex viscosity during warming in dynamic viscoelasticity measurement with a strain of 1% or less after the open-state standing is preferably 200 Pa·s or less.

A method for producing an automotive structure according to the present invention includes applying the adhesive composition for structures described in the present invention to an adherend and then heat-curing the adhesive composition for structures. The adhesive composition for structures according to the present invention can be suitably used for a weld bonding method (a method using both an adhesive and spot welding).

Advantageous Effects of Invention

According to the present invention, there is a remarkable effect that it is possible to provide a low-temperature heat-curable adhesive composition for structures which is able to be cured at a low temperature in a short time, is reduced in groove defects after open-state standing, and is excellent in corrosion resistance, shower resistance, and workability even after open-state standing, and a method for producing an automotive structure using the same and an automotive structure.

DESCRIPTION OF EMBODIMENTS

Figure 1:
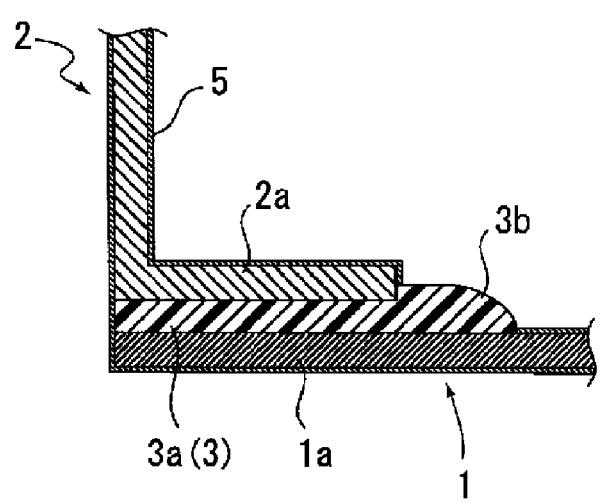
FIG. 1 is a schematic diagram showing an example of a method for producing an automotive structure using an adhesive composition according to the present invention, and shows a state after bonding.

Embodiments of the present invention will be described below; however, these embodiments are shown as examples, and it is obvious that various modifications are possible as long as such modifications do not deviate from the technical ideas of the present invention.

A low-temperature heat-curable adhesive composition for structures according to the present invention is a low-temperature heat-curable adhesive composition for structures including: (A) an epoxy resin, (B) a micro-encapsulated curing agent, (C) a hygroscopic agent, (D) a viscosity modifier, and (E) a stabilizer.

The low-temperature heat-curable adhesive composition for structures according to the present invention preferably does not contain conductive carbon. When the conductive carbon is contained, there is a problem in that a minimum complex viscosity during warming increases, groove defects occur, and corrosion resistance deteriorates. Therefore, the low-temperature heat-curable adhesive composition for structures according to the present invention is preferably a composition containing no conductive carbon.

As the (A) epoxy resin, known epoxy resins can be widely used and are not particularly limited, and examples of the (A) epoxy resin include a bisphenol compound, a hydrogenated bisphenol compound, phenol or o-cresol novolak, aromatic amine, a glycidyl ether substitute of compounds having a known basic skeleton such as a polycyclic aliphatic or aromatic compound, a compound having a cyclohexene oxide skeleton, and the like. Representative examples of the (A) epoxy resin include diglycidyl ether of bisphenol A and a condensate thereof, that is, a so-called bisphenol A type epoxy resin.

An epoxy equivalent of the (A) epoxy resin is preferably from 80 to 10000, and more preferably from 80 to 200.

As the (B) micro-encapsulated curing agent, a known curing agent is essentially used. That is, the (B) micro-encapsulated curing agent includes those which are added and polymerized with the (A) epoxy resin and those which anionic-polymerize the (A) epoxy resin. In addition, the micro-encapsulated amine-based curing agent are those having a catalytic action as a curing accelerator against a curing reaction with the known epoxy curing agent which is added and polymerized with an epoxy resin. It is preferable that the property of the amine-based curing agent in the present invention is a solid which can be powdered at room temperature for micro-encapsulation and has a melting point of 40° C. or higher. Specific examples of the amine-based curing agent include the following.

That is, examples of the amine-based curing agent include aromatic polyamines such as phenylenediamine, tolylenediamine, diaminodiphenylmethane, and diaminodiphenylsulfone; aliphatic polyamines such as diaminocyclohexylmethane and 3,9-bis(3-aminopropyl)2,4,8,10-tetraoxaspiro(5,5)undecane; addition reaction products of these polyamines with the (A) epoxy resin and/or monoepoxy compound; polyamid amines obtained by condensing diamines such as ethylenediamine and xylylenediamine with dicarboxylic acids such as adipic acid and dimer acid; imidazole-based compounds such as 2-methylimidazole, 1-benzyl-2-methylimidazole, 1-cyanoethyl-2-methylimidazole, and 1-cyanoethyl-2-methylimidazole trimellitic acid salt; addition reaction products of the imidazole-based compounds with the (A) epoxy resin: imidazoline compounds such as 2-methylimidazoline; guanidine compounds such as dicyandiamide; tertiary amine compounds such as 1,4-diazabicyclo[2,2,2]octane; and compounds such as novolak salts of 1,8-diazabicyclo[5,4,0]undecene-7.

Only one type of these curing agents may be used, or two or more types of these curing agents may be used in combination. The amount of the curing agent used is equal to that of the case where the curing agent is usually used, and the used amount may be adjusted as necessary. As the method for micro-encapsulating a curing agent, the known method is employed. That is, there are a method for coating with materials capable of forming a film on surfaces of fine powder particles of an amine-based curing agent (JP H05-247179 A, JP H06-73163 A, and the like), a method for blocking a curing agent functional group existing on surface layers of the fine powder particles of the amine-based curing agent with another reactive material capable of reacting with the curing agent functional group (JP S58-83023 A, JP S58-55970 A, JP S64-70523 A, and the like) or the like.

Examples of the (C) hygroscopic agent include calcium oxide, aluminum oxide, calcium chloride, and the like, and calcium oxide is preferably used, and a combination of surface-treated calcium oxide and untreated calcium oxide is more preferably used.

The blending ratio of the component (C) is not particularly limited; however, the blending ratio is preferably 0.1 to 20 parts by mass, and more preferably 1 to 10 parts by mass with respect to 100 parts by mass of the component (A).

Examples of the (D) viscosity modifier include fine powdered calcium carbonate and silica, and silica is preferably used.

The blending ratio of the component (D) is not particularly limited; however, the blending ratio is preferably 1 to 15 parts by mass, and more preferably 1 to 10 parts by mass with respect to 100 parts by mass of the component (A).

Examples of the (E) stabilizer include borate ester, and a borate compound are represented by a general formula shown by Chemical Formula (1) below.

$$B(OR^1)(OR^2)(OR^3) \quad (1)$$

(In the formula, $R^1$ to $R^3$ each represents a hydrogen atom or an alkyl group or an aryl group having 20 or less carbon atoms. $R^1$ to $R^3$ may be the same or different.) Specific examples of the (E) stabilizer include the following. That is, examples of the (E) stabilizer include trimethyl borate, triethyl borate, tripropyl borate, tributyl borate, trihexyl borate, trioctyl borate, tristearyl borate, triphenyl borate, tritoly borate, trixylyl borate, tribenzyl borate, and the like. Only one type of these borate esters may be used, or two or more types of these borate esters may be used in combination. When the number of carbon atoms of the alkyl group and/or the aryl group of the borate compound exceeds 20, the content of boron atoms in the borate compound is lowered, and the effectiveness of the borate compound is significantly lowered. Alternatively, the borate compound itself is solidified, and has a high melting point and poor handleability. The number of carbon atoms is preferably 1 to 12, and more preferably 1 to 8.

The blending ratio of the component (E) is not particularly limited; however, the blending ratio is preferably from 0.001 to 10 parts by mass, and more preferably from 0.01 to 5 parts by mass with respect to 100 parts by mass of the component (A).

In addition to the components described above, a urethane resin, a filler, a diluent, a silane coupling agent, and the like may be added to the adhesive composition for structures of the present invention as long as the effects of the present invention are not impaired. In addition to the components described above, extender pigments (fillers) such as calcium carbonate, barium sulfate, and talc, and color pigments such as carbon black, titanium oxide, and iron oxide can be added. Further, thixo materials such as ketjen black, silica, fine calcium carbonate, and sepiolite may be added. In addition, an acrylic resin can be added as an adhesiveness improving agent for improving adhesiveness such as peeling strength.

In the adhesive composition for structures according to the present invention, a viscosity at 20° C. is 1530 to 3580 (Pa·s) at a shear rate of 0.2 (sec$^{-1}$) according to a measurement method based on JISK 7117-2. By setting this range, showering resistance and coating properties can be achieved in a compatible manner.

In addition, in the adhesive composition for structures according to the present invention, since the minimum value of the complex viscosity $\eta^*$ during warming in dynamic viscoelasticity measurement with a strain of 1% or less (for example, 0.1%), a frequency of 1 Hz, and a temperature raising rate of 5° C./min is 200 Pa·S or less, a groove portion between a joining end part and a protruding portion can be removed, and since the occurrence of groove defects caused by the movement of the protruding portion and a breakage of an electro-deposited coating film caused simultaneously with the occurrence of the groove defects can be prevented, the corrosion resistance is preferable. The minimum value of the complex viscosity $\eta^*$ during the warming is preferably from 50 to 200 Pa·s and more preferably from 80 to 150 Pa·s.

The dynamic viscoelasticity measurement is suitably performed in a range including a temperature range in which a fluidity of the adhesive increases and a temperature range in which the adhesive starts curing. For example, when the adhesive is heated and cured at 170° C., it is suitable to perform during a halfway period (for example, between 40° C. and 90° C.) from an initial normal temperature (20° C.) to the curing temperature condition of the adhesive of 170° C.

In addition, examples of the open-state standing condition in the dynamic viscoelasticity measurement include a condition in which the adhesive is open-state standing at 40° C. and a relative humidity of 85% for 4 days.

Figure 2:
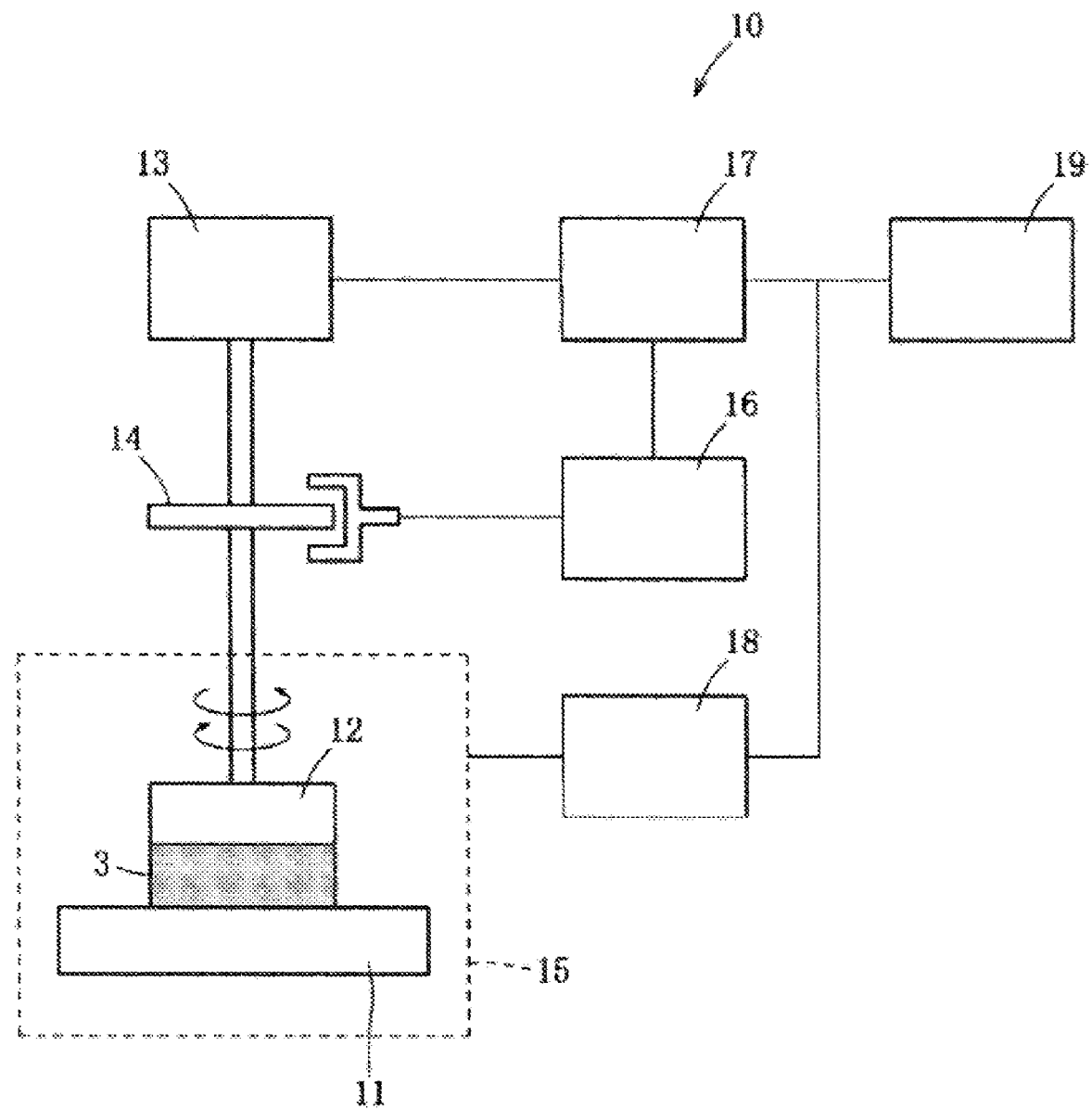
FIG. 2 is a schematic configuration diagram of a rheometer.

The complex viscosity $\eta^*$ during warming can be measured by using, for example, a rheometer or the like. FIG. 2 is a schematic configuration diagram of the rheometer. The rheometer 10 is configured to be able to detect physical properties of an adhesive 3 related to viscoelasticity from response characteristics of strain extracted by applying a sinusoidal stress having an angular frequency ω to a sample.

As illustrated in FIG. 2, the rheometer 10 includes a fixed plate 11, a movable plate 12 which sandwiches the adhesive 3 as a sample in a gap (for example, 0.5 mm) between the fixed plate 11 and the movable plate 12, a drive unit 13 which can apply a stress to the adhesive 3 by rotating and vibrating the movable plate 12 at a predetermined cycle, a disk portion 14 which rotates and vibrates in synchronization with the movable plate 12, a case portion 15 which has the plates 11 and 12 and the adhesive 3 accommodated therein and can adjust an internal temperature up and down, an encoder 16 which can detect a cycle of the movable plate 12 based on the rotational vibration operation of the disk portion 14, a control measurement unit 17 which can measure a viscous friction torque generated in the movable plate 12 simultaneously with controlling the drive unit 13 based on a detection value of the encoder 16, a temperature control unit 18 which controls a temperature in the case portion 15, and an operation unit 19 which can display various measurement values simultaneously with operating the control measurement unit 17 and the temperature control unit 18.

The rheometer 10 detects a dynamic elastic modulus (also referred to as storage elastic modulus) G' and a dynamic viscosity coefficient $\eta'$ based on a phase lag between the stress and the strain applied to the adhesive 3 and the amplitude of the stress and the strain.

A loss elastic modulus G" can be calculated by substituting the dynamic viscosity coefficient $\eta'$ into Equation (1) below. Note that ω is an angular frequency.

$$G''=\omega\eta' \quad (1)$$

The complex elastic modulus G* is calculated by substituting the storage elastic modulus G' and the loss elastic modulus G" obtained by Equation (1) into Equation (2) below. Note that i is an imaginary unit.

$$G^*=G'+iG'' \quad (2)$$

The complex viscosity $\eta^*$ is calculated by substituting the complex elastic modulus G* obtained by Equation (2) into Equation (3) below.

$$\eta^*=G^*/(i\omega) \quad (3)$$

Equation (4) below can be derived from Equations (1) to (3).

$$\eta^*=\eta'-i\eta'' \quad (4)$$

The imaginary part $\eta''$ of the complex viscosity $\eta^*$ is a parameter defined by Equation (5) below.

$$\eta''=G'/\omega \quad (5)$$

The adhesive composition for structures according to the present invention is a low temperature curing type and can be cured at 130 to 170° C. for about 5 to 20 minutes.

The adhesive composition for structures according to the present invention is used to produce an automotive structure by structurally bonding parts such as bodies or parts of an automobile. In particular, a construction method (weld bonding method) using both spot welding and an adhesive is suitably used for adhesion. That is, the adhesive composition for structures according to the present invention is also suitably used for bonding the bodies of the automobile.

The method for producing an automotive structure according to the present invention is preferably a producing method in an automobile manufacturing line, and includes a step of heat-curing after applying an adhesive composition to an adherend. In the method for producing an automotive structure according to the present invention, the application is preferably performed by a robot hand.

FIG. 1 is a schematic diagram showing an example of a method for producing an automotive structure using an adhesive composition according to the present invention, and shows a state after bonding. In FIG. 1, reference numerals 1 and 2 are component members constituting a body of an automobile. A first component member 1 and a second component member 2 which are adherends are bonded by adhesive composition 3 according to the present invention to produce an automotive structure. The adhesive composition 3 is interposed between an adhesive surface part 1a of the first component member 1 and a flange portion 2a of the second component member 2, and the adhesive composition 3 is pushed out by pressurization of spot welding to form a protruding portion 3b. The adhesive composition 3 is cured by heating at a predetermined temperature for a predetermined time to form an adhesive portion 3a. In FIG. 1, reference numeral 5 denotes an electro-deposited coating film, which is formed by electro-deposition-coating paints on surfaces of the first component member 1 and the second component member 2.

EXAMPLES

The present invention will be further specifically described below using examples; however, these examples are set forth to illustrate the present invention, and the scope of the present invention is not limited thereto.

Examples 1 to 2 and Comparative Example 1 to 4

The adhesive composition for structures was produced by the following procedure using each component having the number of parts by mass shown in Table 1 below. Each material was blended and stirred and degassed for 2 minutes under a reduce pressure with a stirring deaerator HM-400WV (available from Kyoritsu Seiki Co., Ltd.) to prepare the adhesive composition for structures.

(1) Shear Strength Test

The resulting adhesive composition for structures was applied to a cold rolled steel sheet of 100 mm×25 mm×1.6 mm with a coating thickness of 0.1 mm, and two steel sheets overlapped to be 12.5 mm, and the protruding adhesive composition for structures was removed, thereby preparing a shear test piece. The test piece was heat-cured while being kept at 130° C. for 10 minutes, and then cooled for 24 hours. Thereafter, the test was performed at a tensile rate of 50 mm/min using a universal tensile tester. A test piece having a shear strength of 15 MPa or more was evaluated as good, and a test piece having a shear strength of less than 15 MPa was evaluated as poor.

(2) Initial Viscosity/Viscosity After Storage Test

The viscosity of the resulting adhesive composition for structures was measured at 20° C. by a rotary viscometer "RST-CPS" available from Brookfield Co. at the initial stage (immediately after production) and after the resulting adhesive composition for structures was stored at 50° C. for 7 days. For the measurement, a parallel plate having a diameter of 25 mm was used, and the conditions were set such that the gap was 0.5 mm and the shear rate was 0.2 s$^{-1}$.

(3) Minimum Complex Viscosity Test After Open-State Standing

When the resulting adhesive composition for structures was in open-state standing at 40° C. and 85% of humidity for 4 days and the temperature raised from 20 to 170° C. at a rate of 5° C. per minute using the rheometer 10 shown in FIG. 2, the minimum value of the complex viscosity was mea-

TABLE 1

|  | Examples 1 | Examples 2 | Comparative Example 1 | Comparative Example 2 | Comparative Example 3 | Comparative Example 4 |
|---|---|---|---|---|---|---|
| (A) Epoxy resin* 1 | 100 | 100 | 100 | 100 | 100 | 100 |
| (B) Curing agent A* 2 (Micro-encapsulated) | 30 | 30 | 0 | 0 | 30 | 30 |
| Curing agent B* 3 (Non-micro-encapsulated) | 8 | 8 | 8 | 8 | 8 | 8 |
| Curing agent C* 4 (Non-micro-encapsulated) | 0 | 0 | 0 | 15 | 0 | 0 |
| (C) Hygroscopic agent A*5 | 5 | 10 | 5 | 5 | 5 | 5 |
| (C) Hygroscopic agent B*6 | 5 | 0 | 5 | 5 | 5 | 5 |
| (D) Viscosity modifier* 7 | 8 | 8 | 8 | 8 | 0 | 8 |
| (E) Stabilizer* 8 | 6 | 6 | 6 | 6 | 6 | 0 |
| Inorganic filler* 9 | 38 | 38 | 38 | 38 | 38 | 38 |
| Reactive diluent* 10 | 3 | 3 | 3 | 3 | 3 | 3 |

In Table 1, a blending table of each blending material is shown in parts by mass, and details of each blending material are as follows.
* 1"DER331" Bisphenol A type liquid epoxy resin available from Olin Corporation.
* 2"HX-3088" Mixture in which 1 part by mass of latent curing accelerator in which imidazole derivative is coated with a reactant such as epoxy resin is dispersed in 2 parts by mass of bisphenol A type liquid epoxy resin available from Asahi Kasei Corporation.
* 3"DYHARD 100SH" Dicyandiamide available from AlzChem Group AZ
* 4"PN-23" Epoxy-imidazole adduct-based curing agent available from Ajinomoto Fine-Techno Co., Inc.
*5"QC-X" Calcium oxide available from Inoue Calcium Corporation
*6"CML-31" Surface-treated calcium oxide available from Omi Chemical Industry Co., Ltd.
* 7"TS-720" Fumed silica treated with polydimethylsiloxane available from Cabot Japan Co.
* 8"L-07N" Borate compound available from Shikoku Chemicals Corporation
* 9"NN # 500" Calcium carbonate available from Nitto Flour Industry Co., Ltd.
* 10"ED-502S" Aliphatic monoglycidyl ether available from ADEKA Corporation Each adhesive composition for structures of Examples 1 and 2 and Comparative Examples 1 to 4 produced above was subjected to the performance test shown below, and the results are shown in Table 2 below.

sured. For the measurement, the parallel plate having a diameter of 25 mm was used, and the conditions were set such that the gap was 0.5 mm, the frequency was 1 Hz, and the strain was 0.1%.

(4) Foamed State Test After Open-State Standing

The resulting adhesive composition for structures was applied to a center of a cold rolled steel plate of 70 mm×150 mm with a thickness of 0.8 mm in a semi-circular bead shape of φ4.5 mm for a length of 130 mm and was in the open-state standing at 40° C. and a humidity of 85% for 4 days, the cold rolled steel sheet of 15 mm×150 mm with a thickness of 0.8 mm was spot-welded from the top of the bead, electro-deposition-coated, and heat-cured while being kept at 150° C. for 20 minutes, and the foamed state of the cured product of the adhesive composition for structures protruding from the steel plate was determined. A product having no groove defect and no foaming was determined as excellent, a product having no groove defect and having a foam of 5 points or less was determined as good, and a product having a foam more than that or having groove defects was determined as poor.

TABLE 2

|  | Examples 1 | Examples 2 | Comparative Example 1 | Comparative Example 2 | Comparative Example 3 | Comparative Example 4 |
|---|---|---|---|---|---|---|
| Shear Strength (Mpa) (130° C. × 10 min keep) | 17.8 | 18.0 | Not cured | 17.7 | 16.8 | 17.7 |
| Determination of shear strength | Good | Good | Poor | Good | Good | Good |
| Initial viscosity (Pa · s) (20° C., 0.2 s⁻¹) | 2624 | 2389 | 3358 | 3931 | Unmeasurable (Low viscosity) | 2561 |
| Viscosity after storage (Pa · s) (viscosity after 7 days at 50° C.) | 3282 | 3526 | 4135 | 5120 | Unmeasurable (Low viscosity) | 3995 |
| Minimum complex viscosity after open-state standing (Pa · s) (40° C. × 85% for 4 days) | 182 | 164 | 865 | Unmeasurable (High viscosity) | 2 | 414 |
| State after open-state standing (40° C. × 85% for 4 days) | Excellent | Good | Not cured | No welding | Excellent | Poor |

In Examples 1 and 2, the shear strength is good even under the curing conditions of 130° C. for 10 minutes which are the low temperature and the short time, the viscosity is suitable at the initial stage and after the storage, the minimum complex viscosity after the open-state standing is 200 Pa·s or less, and the foam after the open-state standing is 5 points or less. That is, the adhesive composition for structures of Examples 1 and 2 which is of a low-temperature curing type having excellent adhesiveness has good viscosity at the initial stage and after the storage and has excellent shower resistance and workability, and can prevent groove defects and the foam after the open-state standing.

On the other hand, in Comparative Example 1, the adhesive composition for structures cannot be cured at a low temperature, in Comparative Example 2, the adhesive composition for structures has a high viscosity after the open-state standing, and thus cannot be spot-welded, in Comparative Example 3, the adhesive composition for structures has too low an initial viscosity, and thus may scatter during the shower process, and in Comparative Example 4, the adhesive composition for structures is thickened after storage to be difficult to apply, and thus can causes groove defects after the open-state standing.

REFERENCE SIGNS LIST

1 First component member
1a Adhesive surface part
2 Second component member
2a Flange portion
3 Adhesive composition
3a Adhesive portion
3b Protruding portion
5 Electro-deposited coating film
10 Rheometer
11 Fixed plate
12 Movable plate
13 Drive unit
14 Disk portion
15 Case portion
16 Encoder
17 Control measurement unit
18 Temperature control unit
19 Operation unit

The invention claimed is:

1. A low-temperature heat-curable adhesive composition for structures, comprising:
(A) an epoxy resin;
(B) a micro-encapsulated curing agent;
(C) a hygroscopic agent;
(D) a viscosity modifier; and
(E) a stabilizer,
wherein the (C) hygroscopic agent comprises surface-treated calcium oxide and non-surface-treated calcium oxide.

2. The low-temperature heat-curable adhesive composition for structures according to claim 1, wherein a minimum value of a complex viscosity during warming in dynamic viscoelasticity measurement with a strain of 1% or less after an open-state standing is 200 Pa·s or less.

* * * * *